F. F. Carroll,
Cotton Planter.
No. 113,626. Patented Apr. 11, 1871.
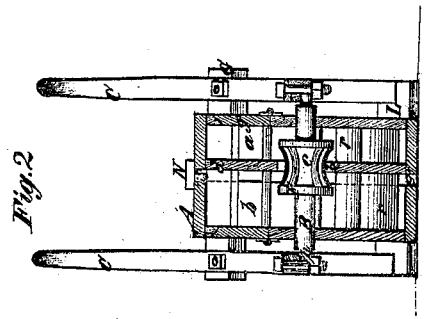
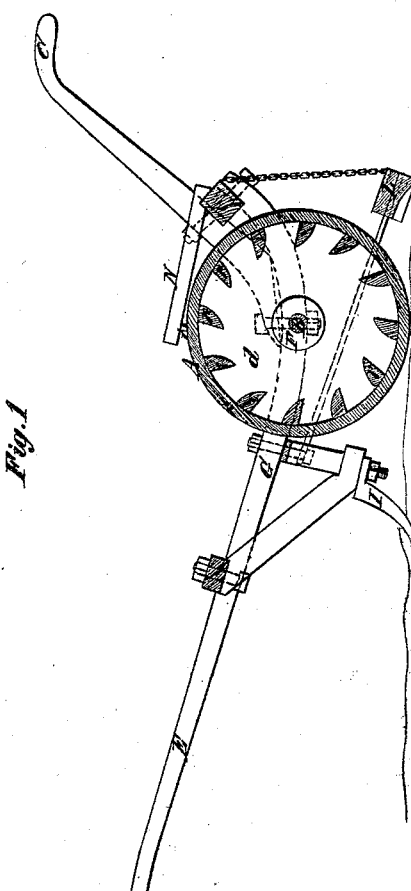
Witnesses.
Fred Haynes
W. Tuska
Francis F. Carroll
per Brown Coombs & Co.
Attorneys

United States Patent Office.

FRANCIS F. CARROLL, OF MIDWAY, SOUTH CAROLINA.

Letters Patent No. 113,626, dated April 11, 1871.

IMPROVEMENT IN COTTON-SEED PLANTERS.

The Schedule referred to in these Letters Patent and making part of the same.

*To all whom it may concern:*

Be it known that I, FRANCIS F. CARROLL, of Midway, in Barnwell county, South Carolina, have invented a new and useful Improvement in Cotton or other Seed-Planters; and I do hereby declare that the following is a full, clear, and exact description thereof, reference being had to the accompanying drawing forming a part of this specification.

This invention consists in a drum or cylinder, which is rolled on the bed to be sown, divided by a partition into two compartments, one of which is internally ribbed and provided with a door, and constitutes a seed-holder; and the other provided at its periphery with a series of holes or openings for the escape of the seed, which is fed into it through a central hole in the partition by a rotating feeder, which is secured, so as to be capable of longitudinal adjustment, on an axle that extends through the said drum or cylinder, and supports the frame to which the furrow-opener, the coverer, and the handles are secured.

In the accompanying drawing—

Figure 1 is a longitudinal section of my seed-planter, and

Figure 2 is a transverse section of the same.

Similar letters of reference indicate corresponding parts in both figures.

A is a drum or cylinder, which is preferably made of wood, and divided vertically by a partition, $d$, into two compartments, $a$ and $b$, the former of which constitutes the seed-holder and the latter the seed-distributer.

The drum has provided on its interior a series of ribs, $r\ r$, and in the central portion of its periphery is a series of slots, $e\ e$, through which the seed escapes from the distributer $b$.

At each side of the drum there is an opening provided with a door, $g$, for the purpose of inserting the seed into the holder and to adjust the seed-feeder F on the axle B, which extends directly through the drum.

The seed-feeder F surrounds the axle B and is held in place thereon simply by friction. It is of annular form, and concavely curved in a longitudinal direction, and provided with a series of cavities, $c\ c$, as shown in fig. 2, and fits within a hole, $h$, in the partition $d$, which is of such size that when the feeder is in such position on the axle that one of its ends is within the hole it is completely closed, and is opened by sliding the feeder so that its middle portion is within the hole.

The axle is provided with journals P P, which support a frame, G, provided with shafts E, handles C, an adjustable furrow-opener, I, and a furrow-coverer, L. A very simple bearing is made for the journals by recessing the under side of the frame to receive them, and turning the nut of a bolt which passes through the frame to cover the under side of the journal.

Attached to this frame G is a wooden bar, N, which overlaps the drum A, and has projecting downwardly from its outer end a pin, $i$, which fits within the slots $e\ e$ in the drum, and forms a stationary clearer, and prevents them from becoming clogged up with earth or other substance.

As the drum revolves the seed is lifted by the ribs or buckets $r\ r$ and thrown onto the seed-feeder, which, if in position to open the hole $h$ in the partition $d$, will, in revolving, empty the seed thrown on it partly into the seed-distributer $b$ and partly back into the seed-holder $a$. The seed fed in this manner into the distributer escapes through the holes $e\ e$ into the furrow opened by the furrow-opener I.

The amount of seed fed into the distributer may be regulated by adjusting the seed-feeder F to open the hole $h$ more or less.

What I claim as my invention, and desire to secure by Letters Patent, is—

The combination of the rolling-drum divided into two compartments, one of which constitutes a seed-holder and the other a distributer, and the seed-feeder F, adjustable on the shaft of the drum within an opening between the said compartments, substantially as and for the purpose herein specified.

FRANCIS F. CARROLL.

Witnesses:
B. F. FOLK,
JOHN L. LEASE.